United States Patent [19]

Kavesh

[11] 3,869,338

[45] Mar. 4, 1975

[54] TUBING FOR CRYOGENIC USE
[75] Inventor: Sheldon Kavesh, Whippany, N.J.
[73] Assignee: Union Carbide Corporation, New York, N.Y.
[22] Filed: Mar. 14, 1972
[21] Appl. No.: 234,636

[52] U.S. Cl............... 161/165, 138/28, 138/32, 138/118, 138/137, 138/140, 138/178, 161/247
[51] Int. Cl............................................ F16i 55/04
[58] Field of Search......... 161/247, 165; 138/28, 32, 138/118, 119, 137, 140, 178; 260/29.6 R, 29.6 B, 29.6 XA, 29.6 WA

[56] References Cited
UNITED STATES PATENTS

| | | | |
|---|---|---|---|
| 3,475,245 | 10/1969 | Bearer | 161/247 |
| 3,644,262 | 2/1972 | Stehle | 260/29.6 |
| 3,721,269 | 3/1973 | Choate | 161/247 |
| 3,725,124 | 4/1973 | Gorton | 161/247 |

*Primary Examiner*—Marion E. McCamish
*Attorney, Agent, or Firm*—Maurice W. Ryan

[57] ABSTRACT

Tubing suitable for cryogenic use is disclosed. The tubing, which is composed of a copolymer of ethylene with either vinyl acetate or ethyl acrylate, has dimensions such that the ratio of the outside diameter to the inside diameter of the tubing is at least about 1.5.

10 Claims, No Drawings

TUBING FOR CRYOGENIC USE

The invention relates to tubing suitable for use at cryogenic temperatures.

At present, approximately seven million units of whole blood are collected annually in the United States and are stored fresh at 4°C. Of these units that are originally collected, the red cell contents of between 700,000 and one million units are discarded at the end of 21 days because these cells begin to deteriorate rapidly after 21 days at 4°C.

Medical researchers have been actively working on the problem of long-term storage of blood and blood components, and are developing procedures for freeze-preservation of blood at cryogenic temperatures ranging from −80°C. to −196°C. Under these conditions, red blood cells may be preserved for periods of up to several years. It is expected that wide-spread adoption of a blood freezing process will require development of an economical multiple bag blood collection system which will permit blood collection, separation into fractions, additions of cryo-protective agents, cryogenic freezing and storing, and thawing and washing, all without jeopardizing the sterility and purity of the blood. The development of such a system will require a cryogenically durable connecting tubing to conduct solutions and/or blood fractions from one hermetically sealed container to another.

Other applications exist for which a cryogenically durable tubing is useful. For instance, such a tubing can be used as a conductor for low temperature gases or liquids between a storage tank and an operating tool during cryogenic surgery.

It is an object of this invention to provide a tubing suitable for cryogenic use, wherein such tubing maintains its flexibility at cryogenic temperatures down to at least −196°C., wherein the tubing is flexible and easily manipulatable at room temperature (i.e., at about 65° to 70°F.), and wherein the tubing will not kink upon bending at room temperature. (The term "kink" refers to the collapse of the tube wall such that passage through the tube is substantially blocked.)

These and other objects of the invention are accomplished by the provision of tubing that is composed of a copolymer of ethylene and comonomer that is either vinyl acetate or ethyl acrylate. The molecular weight of the copolymer is such that its melt index, as determined by ASTM–D–792–60T, is not greater than the value of the relationship:

$$\frac{\text{Weight per cent comonomer in copolymer}}{6}$$

Also, the dimensions of the tubing are such that the ratio of the outside diameter to the inside diameter of said tubing is at least about 1.5.

The tubing of the invention is composed of either an ethylene/vinyl acetate copolymer or an ethylene/ethyl acrylate copolymer. The nature and preparation of ethylene/vinyl acetate copolymers and ethylene/ethyl acrylate copolymers are well known in the art. As indicated above, the molecular weights of the copolymers should be such that the melt indexes, as determined by ASTM–D–792–60T, was not greater than the value of the relationship indicated above. Among the preferred copolymers of the invention are copolymers of ethylene and ethyl acrylate having from about 2 to about 25 weight per cent ethyl acrylate and preferably about 14 weight per cent ethyl acrylate. Another class of preferred copolymers are copolymers of ethylene and vinyl acetate having between 4 and 25 weight per cent of vinyl acetate, and preferably having between 7 and 18 weight per cent vinyl acetate.

The dimensions of the tubing are such that the ratio of the outside diameter to the inside diameter of the tubing is at least about 1.5, and is preferably at least about 2. When the ratio is less than about 1.5, the tubing tends to have less resistance to kinking at room temperature.

The outside diameter of the tubing is preferably not more than about one fourth of an inch.

The tubing of the invention can be produced by conventional extrusion procedures that are well known in the art.

The following examples illustrate certain aspects of the invention.

EXAMPLE 1

Tubes were prepared from several different polymers. The dimensions, resistance to damage by cold bending about a 1 inch radius of curvature, and resistance to kinking (i.e., resistance to collapse of the tube wall) upon bending about a one fourth inch radius of curvature at room temperature are described in Table I.

TABLE I

| TUBING MATERIAL | TUBING DIMENSIONS, INCHES | | | RESISTANCE TO COLD BENDING at −196°C (a) | RESISTANCE TO KINKING (b) |
| --- | --- | --- | --- | --- | --- |
| | O.D. | I.D. | O.D./I.D. | | |
| Polyethylene homopolymer 0.08 M.I. 0.917 density | 0.240 | 0.200 | 1.2 | Broke | Kinked |
| Ethylene/ethyl acrylate copolymer 14% Ethyl Acrylate 1.5 M.I. | a) 0.240 | 0.200 | 1.2 | Broke | Kinked |
| | b) 0.203 | 0.101 | 2.0 | OK | OK |
| | c) 0.150 | 0.110 | 1.36 | OK | Kinked |
| | d) 0.150 | 0.120 | 1.25 | OK | Kinked |
| | e) 0.150 | 0.070 | 2.14 | OK | OK |
| | f) 0.100 | 0.080 | 1.25 | OK | Kinked |
| Ethylene/vinyl acetate copolymer 17–19% Vinyl Acetate 2.5 M.I. | a) 0.203 | 0.101 | 2.0 | OK | OK |
| | b) 0.150 | 0.070 | 2.14 | OK | OK |
| Ethylene/vinyl acetate copolymer 6–8% Vinyl Acetate 1.0 M.I. | a) 0.150 | 0.110 | 1.36 | OK | Kinked |
| | b) 0.150 | 0.120 | 1.25 | OK | Kinked |
| | c) 0.100 | 0.080 | 1.25 | OK | Kinked |

(a) Bending about 1" radius of curvature at −196°C.
(b) Bending about ¼" radius of curvature at room temperature.

What is claimed is:

1. Tubing suitable for use at cryogenic temperatures, said tubing being composed of a copolymer of ethylene and a comonomer selected from the group consisting of vinyl acetate and ethyl acrylate, wherein the molecular weight of said copolymer is such that its melt index, as determined by the test procedure of ASTM-D-792-60T, is not greater than the value of the relationship:

$$\frac{\text{Weight per cent comonomer in copolymer}}{6}$$

and wherein the ratio of the outside diameter to the inside diameter of said tubing is at least about 1.5.

2. The tubing of claim 1 wherein said tubing is composed of a copolymer of ethylene and ethyl acrylate having from about 2 to about 25 weight per cent ethyl acrylate.

3. The tubing of claim 2 wherein said tubing has an outside diameter not greater than about one fourth inch.

4. The tubing of claim 2 wherein said copolymer contains about 14 weight per cent ethyl acrylate.

5. The tubing of claim 4 wherein said tubing has an outside diameter not greater than about one fourth inch.

6. The tubing of claim 1 wherein said tubing is composed of a copolymer of ethylene and vinyl acetate having from about 4 to about 25 weight per cent vinyl acetate.

7. The tubing of claim 6 wherein said tubing has an outside diameter not greater than about one fourth inch.

8. The tubing of claim 6 wherein said copolymer contains from about 7 to about 18 weight per cent vinyl acetate.

9. The tubing of claim 8 wherein said tubing has an outside diameter not greater than about one fourth inch.

10. The tubing of claim 1 wherein said tubing has an outside diameter not greater than about one fourth inch.

* * * * *

UNITED STATES PATENT OFFICE
CERTIFICATE OF CORRECTION

Patent No. 3,869,338            Dated    March 4, 1975

Inventor(s) Sheldon Kavesh

It is certified that error appears in the above-identified patent and that said Letters Patent are hereby corrected as shown below:

In column 2, lines 1, 2, and column 3, lines 11, 12:

Change "Weight per cent comonomer in copolymer"
$$\frac{}{6}$$

to read $\underline{\text{--Weight per cent comonomer in copolymer--}}\atop 6$

Signed and Sealed this

*thirtieth* Day of *December 1975*

[SEAL]

*Attest:*

RUTH C. MASON           C. MARSHALL DANN
*Attesting Officer*          *Commissioner of Patents and Trademarks*